United States Patent
Georgeson et al.

(10) Patent No.: US 9,448,758 B2
(45) Date of Patent: Sep. 20, 2016

(54) PROJECTING AIRPLANE LOCATION SPECIFIC MAINTENANCE HISTORY USING OPTICAL REFERENCE POINTS

(75) Inventors: Nathanael T. Georgeson, Tacoma, WA (US); Gary E. Georgeson, Tacoma, WA (US); James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 479 days.

(21) Appl. No.: 13/552,445

(22) Filed: Jul. 18, 2012

(65) Prior Publication Data

US 2014/0022281 A1 Jan. 23, 2014

(51) Int. Cl.
| | | |
|---|---|---|
| *G06F 3/14* | (2006.01) | |
| *B64F 5/00* | (2006.01) | |
| *G06Q 10/00* | (2012.01) | |

(52) U.S. Cl.
CPC ............ *G06F 3/1454* (2013.01); *B64F 5/0045* (2013.01); *G06Q 10/20* (2013.01); *G09G 2354/00* (2013.01); *G09G 2370/022* (2013.01); *G09G 2380/12* (2013.01)

(58) Field of Classification Search
None
See application file for complete search history.

(56) References Cited

U.S. PATENT DOCUMENTS

| | | | |
|---|---|---|---|
| 8,060,835 B2 * | 11/2011 | Newcomer | G06T 19/20 382/149 |
| 2002/0052709 A1 | 5/2002 | Akatsuka | |
| 2002/0069001 A1 * | 6/2002 | Sinex | G06Q 10/025 701/33.9 |
| 2007/0010923 A1 * | 1/2007 | Rouyre | G05B 23/0267 701/31.4 |
| 2009/0030544 A1 * | 1/2009 | Floeder | G01N 21/8851 700/122 |
| 2009/0086027 A1 * | 4/2009 | Chaykin | G06Q 30/02 348/169 |
| 2009/0086199 A1 * | 4/2009 | Troy et al. | 356/251 |
| 2009/0319544 A1 * | 12/2009 | Griffin | G06F 17/30563 |
| 2012/0082383 A1 * | 4/2012 | Kruglick | 382/195 |
| 2012/0218300 A1 * | 8/2012 | Hayakawa | 345/633 |
| 2012/0229842 A1 * | 9/2012 | Groves | H04N 1/00347 358/1.15 |

FOREIGN PATENT DOCUMENTS

| | | | | |
|---|---|---|---|---|
| EP | 2438880 A1 * | 4/2012 | | A61B 19/00 |
| JP | H0886615 A | 4/1996 | | |
| WO | 2011104167 A1 | 9/2011 | | |

* cited by examiner

*Primary Examiner* — Jwalant Amin
(74) *Attorney, Agent, or Firm* — Felix L. Fischer

(57) ABSTRACT

A method for displaying location specific maintenance history for an object is implemented by operating a camera to locate at least one marker tag with fiducial marker-based tracking functionality on the object to provide a reference to a coordinate system associated with the object. An area of the object surrounding the coordinates defined by marker tag is determined from the coordinate system. A repair history for the determined area is then projected onto the object with the projection referenced to the coordinate system associated with the object.

18 Claims, 13 Drawing Sheets

PROJECTING AIRPLANE LOCATION SPECIFIC MAINTENANCE HISTORY USING OPTICAL REFERENCE POINTS

BACKGROUND INFORMATION

1. Field

Embodiments of the disclosure relate generally to the field of maintenance history data storage and viewing and more particularly to a system employing Augmented Reality (AR) enabled mobile maintenance tracking using optical reference points with a camera and projection system.

2. Background

Modern mechanical systems such as aircraft have extensive maintenance requirements and data records. Current maintenance data systems allow technicians to retrieve technical manuals and other maintenance information for a system type being worked on in portable computer or handheld devices for ease of access to necessary information. Many systems additionally include recorded maintenance information specific to the exact system being examined. This allows technicians immediate access to necessary information without having to leave the work area to view manuals, data records or computer terminals with the desired information.

The cost-effective inspection, repair and monitoring of repairs on composite aircraft requires precise locating and sizing of these repairs and their corresponding nondestructive evaluation (NDE) data. Current repair designs are dependent upon the location and size of previous repairs, which may not be obvious in external observations, for example a scarfed composite repair. Visual or enhanced visual inspection during routine maintenance checks (such as UV fluorescence measurements of chromatic witness surfaces) or ultrasonic re-inspection of a repair after a nearby lightning strike, require precise knowledge of damage and repair locations. Aircraft "walk-arounds" or visual inspections are regularly done by pilots and maintenance workers to examine the aircraft for maintenance issues, but provide little in terms of real information.

It is therefore desirable to provide a maintenance history solution that combines maintenance history visualization (damage, repair, NDE, etc.) on-aircraft location, and mobile devices, for user-friendly real-time and remote-expert maintenance tracking. It is further desirable that the solution be self registering using optically detection of temporary or permanent reference points.

SUMMARY

Embodiments disclosed herein enable a method for displaying location specific maintenance history for an object by operating a camera to locate marker tags on the object to provide an absolute reference position and orientation in a coordinate system associated with the object. When the marker tag is on area of the object that is within the field of view (FOV) of the camera, and can be sufficiently resolved by the camera optics, the position and orientation data represented in the marker pattern can be extracted and used as reference location defined in the coordinate system associated with the object. Additional relative position and orientation changes by the camera from that reference location can be determined using motion tracking techniques involving fiducial patterns embedded in the marker tag. Image warping is used to compensate for non-perpendicular alignment of the projector aim direction relative to the target surface. A repair history for the determined area is then projected onto the object with the projection referenced to the coordinate system associated with the object.

The embodiments for the system for providing location specific maintenance history utilize a handheld device incorporating a camera, a projector and a communications interface. A microcontroller is connected to the communications interface and interconnected to the camera to receive image information from a region on an object within the FOV of the camera. The microcontroller is further interconnected to the projector to transmit repair history information for projection onto the object. A remote computer system incorporates a CAD database and a maintenance database with repair history and a mating communications interface. Software modules present on one or both of the microcontroller and remote computer system are employed for identifying markers on a structure present in the image information. The software modules then determine an absolute reference position for the handheld device to determine coordinates in the CAD database corresponding to the FOV and repair history information from the maintenance database is retrieved corresponding to determined coordinates. The repair history information is communicated to the microcontroller for transmission to the projector for projection onto the surface of the object at the defined coordinate location.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide an optical reference system for Augmented Reality (AR)-enabled mobile maintenance tracking that can be built, deployed temporarily and periodically, and maintained easily in the computer memory of portable devices. AR allows projection of computer-generated elements overlaid on real-world objects to provide the viewer with an enhanced visualization of both real world elements and computer generated elements. It enables mobile non-destructive evaluation (NDE) or maintenance data to be displayed all around a structure such as an aircraft during pilot "walk-arounds" or maintenance checks with a handheld mobile device. Alternative databases with additional information regarding the aircraft could also be accessed and information projected into the Global on-aircraft NDE and repair history can be tracked using mobile devices with video cameras and projectors registered to the aircraft coordinate system.

Figure 1:
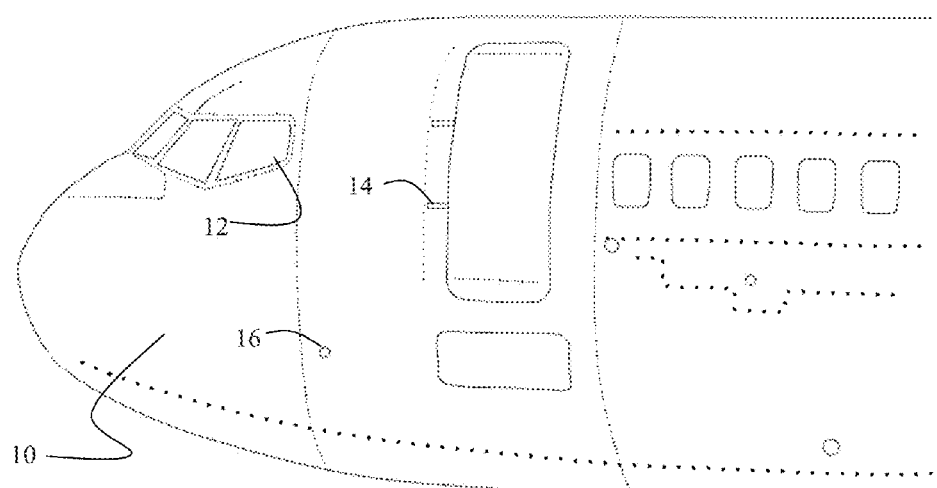
FIG. 1 is a pictorial view of an example aircraft fuselage on which the described embodiments may be used.

Referring to the drawings, FIG. 1 shows an aircraft fuselage 10 as an example of a structure or object on which the present embodiments may be used. The fuselage has been constructed using a detailed Computer Aided Design (CAD) database, which is a three dimensional model of the structure in which items are defined with respect to a common Cartesian coordinate system. That coordinate system may then be applied as a reference coordinate system for the absolute position of any element of the structure contained in the CAD database. This CAD database is then maintained and available for reference in evaluations of ongoing inspection and maintenance of the aircraft. The CAD database provides a coordinate system and exact geometrical information interrelated to that coordinate system associated with the entire structure and all components contained therein. As maintenance is performed, information regarding repairs or other maintenance procedures is stored with respect to this reference coordinate system in a maintenance and/or NDE database which is also keyed to the reference coordinate system. While a CAD database is employed for the example embodiments, any system which establishes a reference for absolute position to a common coordinate system may be employed.

Figure 2:
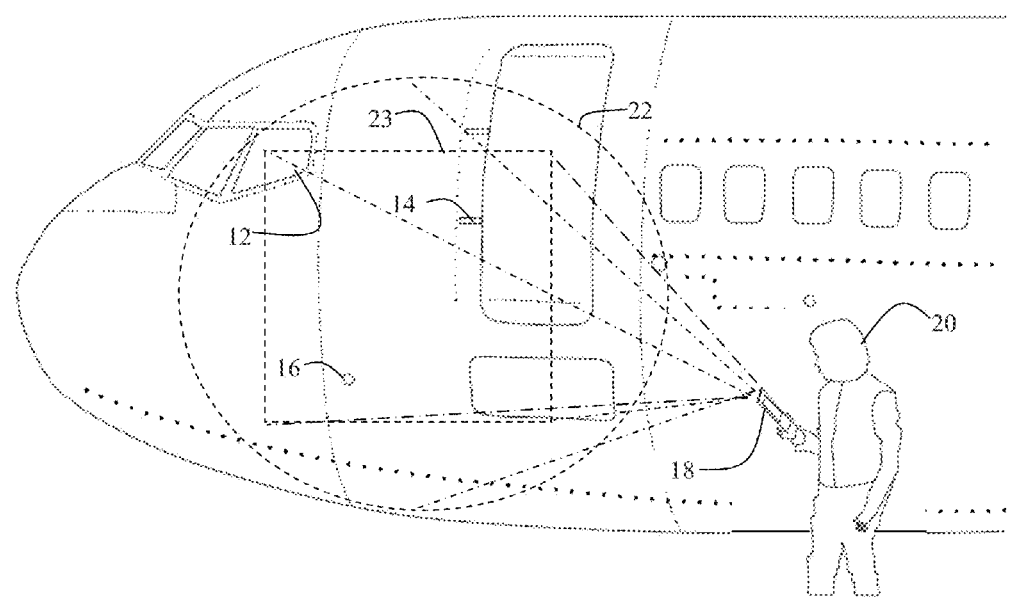
FIG. 2 is a pictorial view of the fuselage of FIG. 1 with camera and projection simulation from a handheld device displayed.

When viewed from the exterior, the fuselage 10 has numerous features which may be correlated to the same features in the CAD database. This one-to-one mapping between the physical positions of features on the real object and the Cartesian coordinates from measurements or the virtual model provides the necessary elements of the motion tracking process described for the embodiments herein. Determination of the relative position and orientation of the camera to the target object can be accomplished with fiducial-based tracking techniques used by some AR systems, such as ARToolKit. Other feature-based techniques, such as Visual Simultaneous Localization and Mapping (V-SLAM), may also be used for position tracking. These techniques will be described in greater detail subsequently. Features such as a window corner 12, a door hinge 14 or a pitot static port 16 present in the CAD database with known absolute dimensions in a 3D representation and data from the maintenance database may be similarly identified in the 3D representation. As shown in FIG. 2A, a handheld device 18 with an integrated camera is held by a user such as technician 20 may be used at a desired relative position and orientation with respect to the fuselage to observe a particular region of the structure within field of view (FOV) of the camera (designated element 22). A projector on the handheld device may then project into a region of projection (ROP) 23 as designated by image lines 24 desired information from either the CAD database or the maintenance database onto the structure.

Figures 3A, 3B:
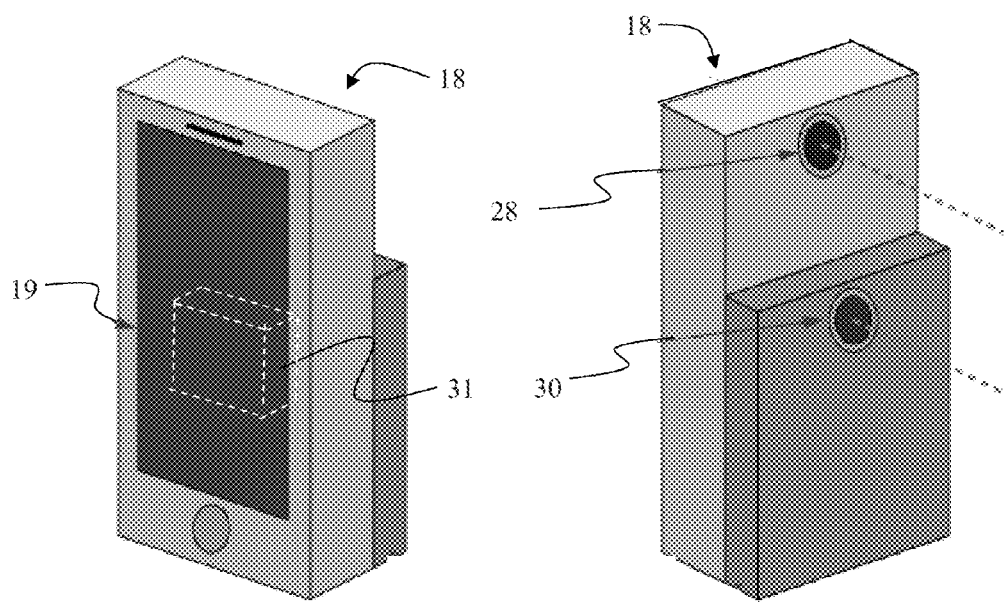
FIG. 3A is a schematic isometric front view representation of an example handheld device.
FIG. 3B is a schematic isometric rear view representation of the example handheld device.
Figure 3C:
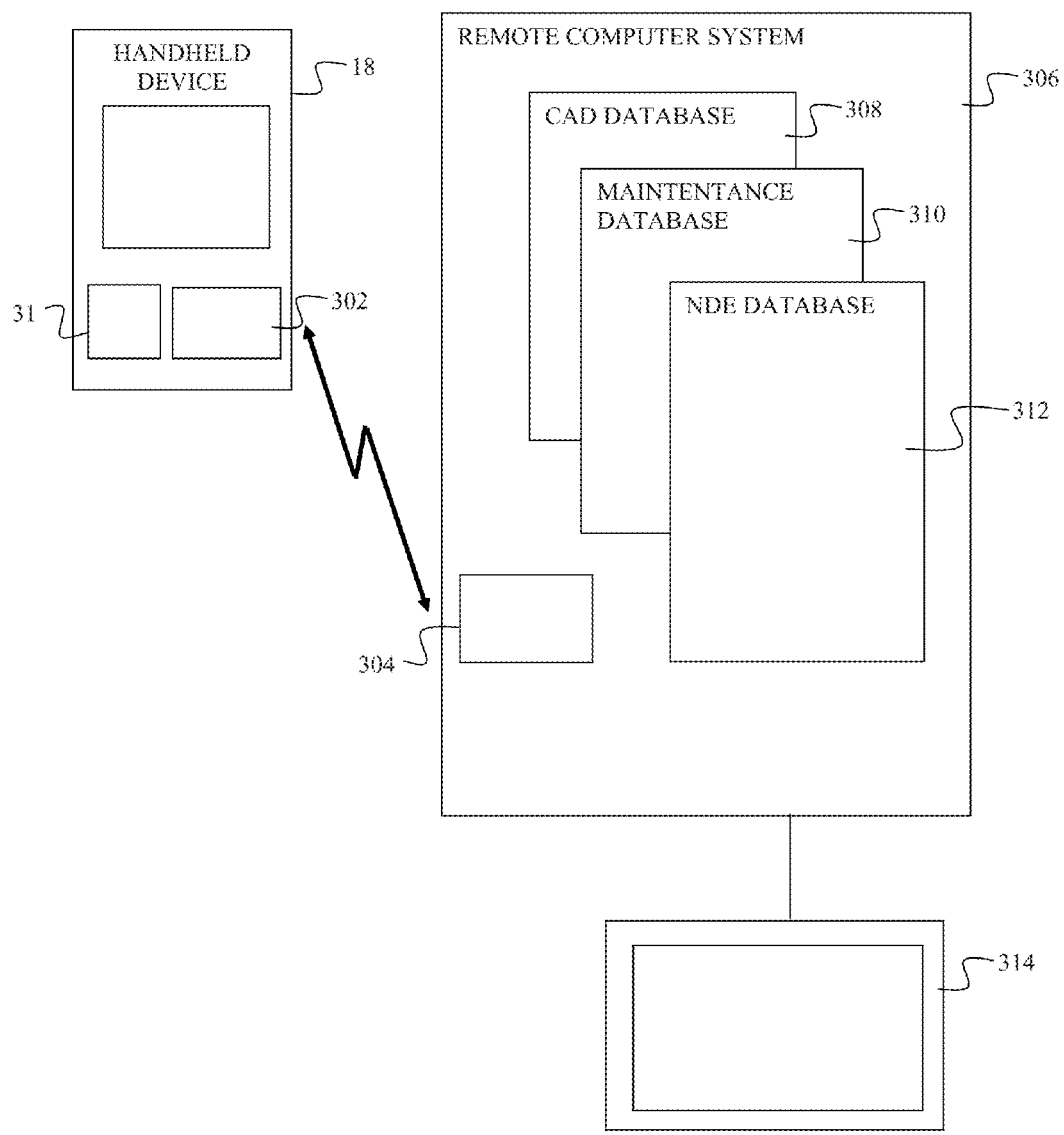
FIG. 3C is a block diagram of the systems communication between the handheld device and associated CAD, maintenance and NDE databases.

The hand held device 18 as shown in FIGS. 3A and 3B may employ an iOS device (such as an iPhone® or iPad® produced by Apple Inc. Cupertino, Calif.) or other "smart phone", tablet or other hand held computing device. In alternative embodiments, a hands free device such as a head-mounted display (HMD) with integrated camera, processing and laser projection systems. The handheld device 18 includes a screen 19, an integrated or attachable camera 28 and a projector 30 which may be a laser based projector such as a Pico projector available from Micro Vision Inc. of Redmond, Wash. The hand held device may also incorporate elements such as a microphone, GPS, and an accelerometer/gyro, and may provide wireless communication from the handheld device for interface to the CAD database for the structure being viewed, a maintenance database with corresponding maintenance information and other information databases associated with the structure. The handheld device 18 includes a microprocessor 31 for operation of software routines for various functions to be described subsequently. FIG. 3C shows a block diagram of the system elements interfacing with the handheld device 18. As previously described, the handheld device may incorporate a wireless communication interface 302 which communicates with a mating wireless communication interface 304 in a remote computer system 306. Such communication may be cellular, Wi-Fi or internet based with intermediary receivers and transmitters as required. The remote computer system houses the CAD data base 308, maintenance database 310 and NDE database 312. A remote display 314 allows a remote non-destructive inspection (NDI) expert or other remote personnel to view the camera image transmitted from the handheld device 18. While shown as communicating with an external computer system, in certain embodiments, the handheld device may contain sufficient memory and processing power for storage of all database and operating information eliminating the need for communication with an external system.

Figure 4:
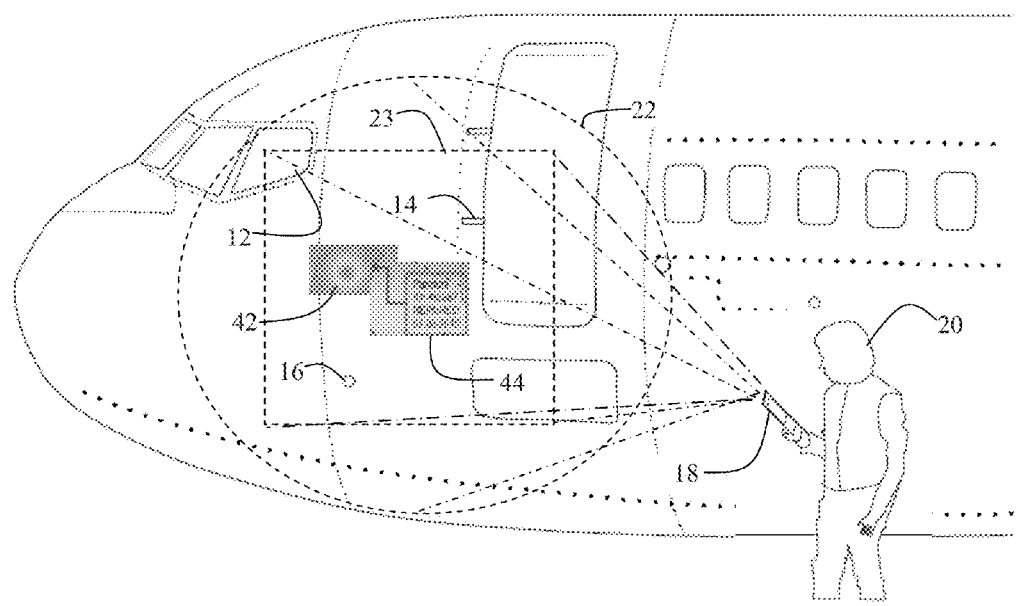
FIG. 4 is a pictorial view of the camera field of view (FOV) with identified features and maintenance data projected into a region of projection (ROP)

The projector 30 on the handheld device 18 may project into an ROP 23 on the surface of the fuselage the desired information regarding maintenance repairs from the maintenance database, NDE information from the NDE database or structural information regarding the aircraft from the CAD database. Any desired information from the CAD database or the associated maintenance database which is relevant to the imaged FOV 22 may be selected and transmitted to the handheld device and displayed by the projector onto the ROP 23 on the fuselage 10. In an example shown in FIG. 4, information regarding a repair is projected showing the location and extent of the repair 42 and a data block 44 regarding the maintenance performed as a puncture repair. Information about features of the fuselage from the CAD database such as window corner 12, door hinge 14 or pitot static port 16 or features hidden below the skin such as stingers or other structural members or components may also be displayed as a portion of the projected image if desired.

In order to project correctly onto the surface of the target object the projected image needs to be warped in such a way so that it will be properly projected from any angle. Items used by the microprocessor in the handheld device to generate the proper image correction are camera offset from the surface, camera orientation relative to the surface normal, orientation difference between the camera view direction and the projection direction, camera and projector lens parameters, curvature of the target surface. Each of these particular parameters is established through a determination of absolute position of the handheld device with respect to the CAD database as will be described subsequently. The projection into the ROP to correct for differences in perspective between the ROP and the camera FOV or to provide a corrected projection for a viewer at a location not coincident with the handheld device may be accomplished as disclosed in U.S. Pat. No. 7,859,655 entitled METHOD INVOLVING A POINTING INSTRUMENT AND A TARGET OBJECT.

If the viewer for the projection is at a different location than the handheld device 18 and projector 30, specification of the viewer location to the microcontroller 33 in the handheld device allows calculation of the perspective correction for the projection from the projector to correct the perspective for the position of the viewer. Similarly, specification of the position of the ROP 23 on the surface as an absolute position and identification of the location of the handheld device 18 based on the FOV 22 allows similar correction of the projected image for viewing from the location of the handheld device.

A laser-based projector is required so that all parts of the projected image will always be in focus.

Figure 5:
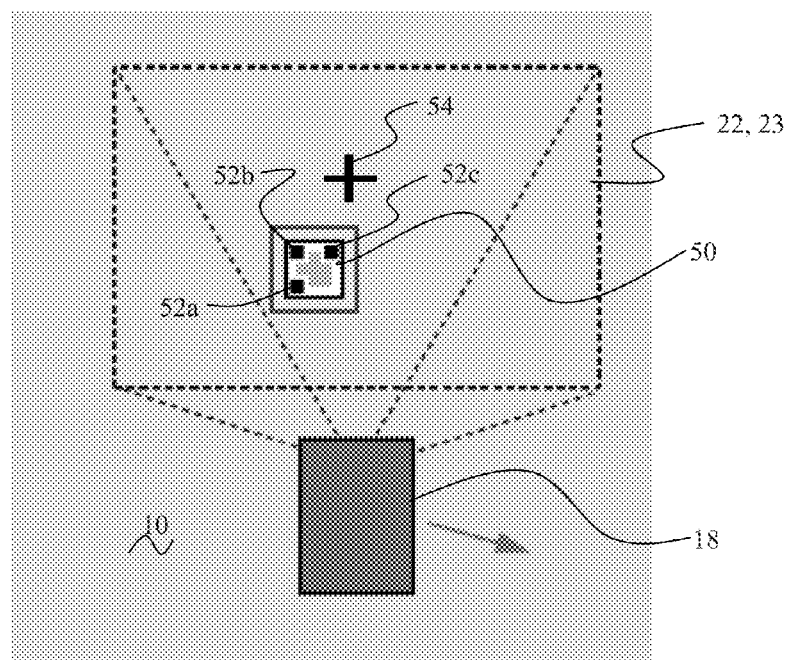
FIG. 5 is a schematic view of the FOV and ROV relative to the handheld device for absolute position determination using a QR code pattern marker.

For determination of the location (position and orientation) of the handheld device 18 relative to the target object, acquisition of initial reference location information in an absolute coordinate system (such as airplane coordinates) is required. Establishing the relative location of the handheld device 18 with respect to the structure is accomplished in an initial embodiment through the use of data markers on the fuselage 10 such as Quick Response (QR) code patterns. The relative tracking functionality enabled by the position and alignment registration features in the QR code pattern allows the distance and relative angle from the camera 28 (and the attached handheld device 18) to be computed. QR code pattern 50 is within the FOV 22 of the camera as shown in FIG. 5, and the location data embedded in its data pattern will be the reference location used for subsequent motions. For simplicity in FIG. 5 and following FIGS. 7A-7C, the camera FOV 22 and projector ROP 23 are shown coincident. The QR code may also be employed to determine changes in relative position and orientation of the camera using alignment fiducial markers 52a, 52b and 52c, which are part of the QR code pattern. Algorithms for position and orientation tracking and processing may be employed similar to those disclosed in ARToolKit supported by Human Interface Technology Laboratory (HIT Lab) at the University of Washington, HIT Lab NZ at the University of Canterbury, New Zealand, and ARToolworks, Inc, Seattle and disclosed at http://www.hitl.washington.edu/artoolkit/ or similar position and orientation determination software. For the embodiments described herein, software routines employing these types of location tracking algorithms operate in the microprocessor of the handheld device. The relative position and orientation of the fiducials with respect to the camera on the handheld device as shown in FIG. 5 provides data for determination of the camera pose relative to the structure. This continuously updated relative localization information, along with the discrete absolute position and orientation data contained within the data payload region of the QR code read by the camera, is used to provide continuous tracking in the absolute coordinate system of the structure. This tracking functionality allows positioning at any location on the fuselage 10 so long as at least one QR code pattern remains within the FOV of the camera and at a distance that can be resolved by the camera. With the absolute position and orientation of the camera 28 on the handheld device 18 relative to the fuselage known, data from an on-board or off-board database associated with the location of interest can be retrieved. Data can be in multiple forms: text, icons, photographs, NDI scans, video, 3D CAD models, even sound recordings which can then be displayed either on the handheld device or projected onto the surface by the projector 30.

Figure 6:
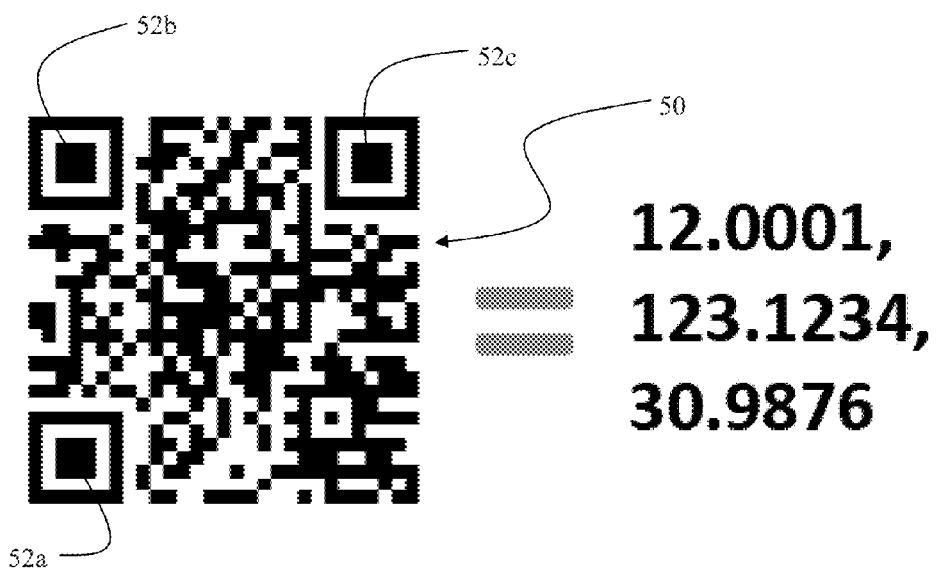
FIG. 6 is an example of data contained within the QR code pattern.

The QR code pattern internal data may provide specific coordinates in the CAD database as shown in FIG. 6 for QR code pattern 50 with example Cartesian coordinates x=12.0001, y=124.1234 and z=30.9876 as embedded data. Orientation or a unique identifier tag string may also be encoded into the data payload region of the QR code. Placement of the QR code pattern at that location (using one of several methods to be described in greater detail subsequently) then allows the precise location within the coordinate system of the fuselage 10 or other structure on which the QR code pattern is placed.

While QR code patterns will be used for the description of embodiments herein, alternative data markers may be employed. Any source that supplies relative position and orientation data may be employed such as UPC standard bar codes, Data Matrix (ECC 200) 2D matrix bar codes, Maxi Code 2D matrix bar code (used by UPS, public domain), Radio Frequency Identification (RFID) passive tags that require a radio source (reader) to energize them, or Active RFID (self-powered RFID tags) for alternative embodiments. As with the QR code examples, these alternate forms of discrete data storage can be used along with relative motion tracking to provide continuous tracking in an absolute coordinate system.

Interactive data acquisition may also be accomplished by the handheld device 18. In some usage scenarios it may be desired to use the real-time tracking to acquire the position of a point of interest that is some distance away from one of the QR codes and still within the view of the camera. The fiducial marker-based position and orientation tracking calculation capability allows such features as projection of a target designator, such as a crosshair ("+") 54 shown in FIG. 5. As an example, the user may instruct the laser projector 30 to display the target designator on the target surface and move the handheld device 18 until the target designator is projected on the area of interest. Then the user would press a button on the hand-held device to record the position on the surface where the crosshair was located or display information about the location selected either on the handheld screen or through projection onto the ROP on the target surface. The user may query the CAD database from the handheld device to receive on screen (or project onto the ROP) the coordinates of the target marker.

Figure 7A:
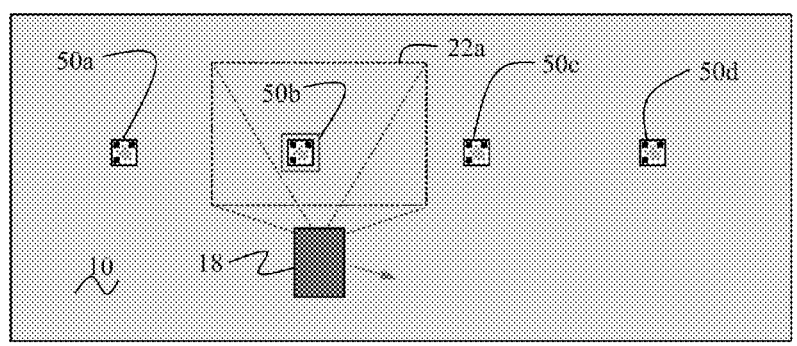
FIGS. 7A-7C are schematic views of various panning positions of the FOV and associated determination of position with an array of QR code pattern markers.
Figure 7B:
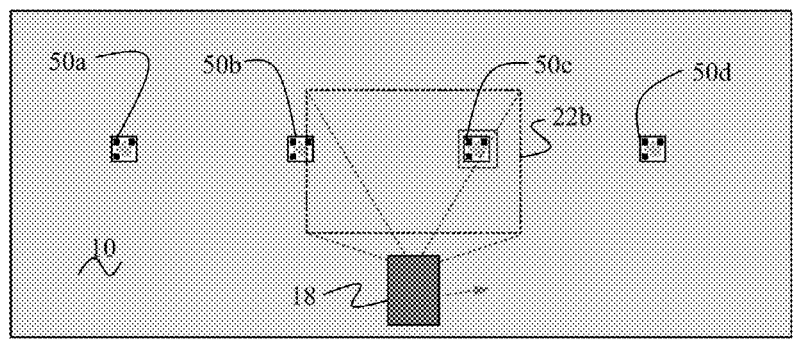
Figure 7C:
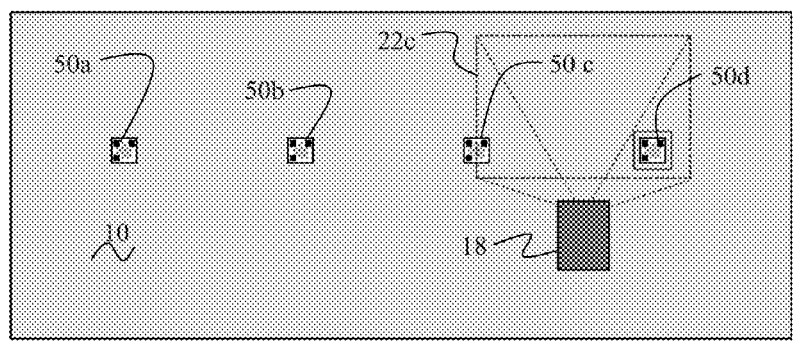

The use of multiple QR code patterns spaced on the target object, such as fuselage 10, allows the camera FOV 22 to be moved along the fuselage with the associated data from the databases (CAD, maintenance, NDE) and real time interactive display from the projector 30 adjusted for the moving position of the handheld device 18. As shown in FIGS. 7A-7C, QR code patterns 50a, 50b, 50c, and 50d are spaced on fuselage 10 in an array to allow at least one QR code pattern to be within the FOV as the camera of the handheld device is moved or panned along the surface. In an initial location of handheld device 18 with an associated positioning of the camera FOV 22a as shown in FIG. 7A, QR code pattern 50b is within the camera FOV and is employed using the fiducial marker-based position and orientation tracking functionality to determine the relative location (position and orientation) of the handheld device 18 with respect to the absolute coordinate system of the CAD database information for the fuselage 10. As handheld device 18 is moved to a second location as shown in FIG. 7B, QR code 50C comes into the camera FOV 22b allowing continuous real-time update of the relative position and orientation of the handheld device. Similarly, upon moving the handheld device to a third location, QR code pattern 50d comes into view of the camera FOV 22c. While linear translation-based repositioning of the handheld device is shown in FIGS. 7A-7C similar functionality is obtained by angular motion of the handheld device 18 and camera 28 sweeping the camera FOV along the surface of fuselage 10.

Figure 7D:
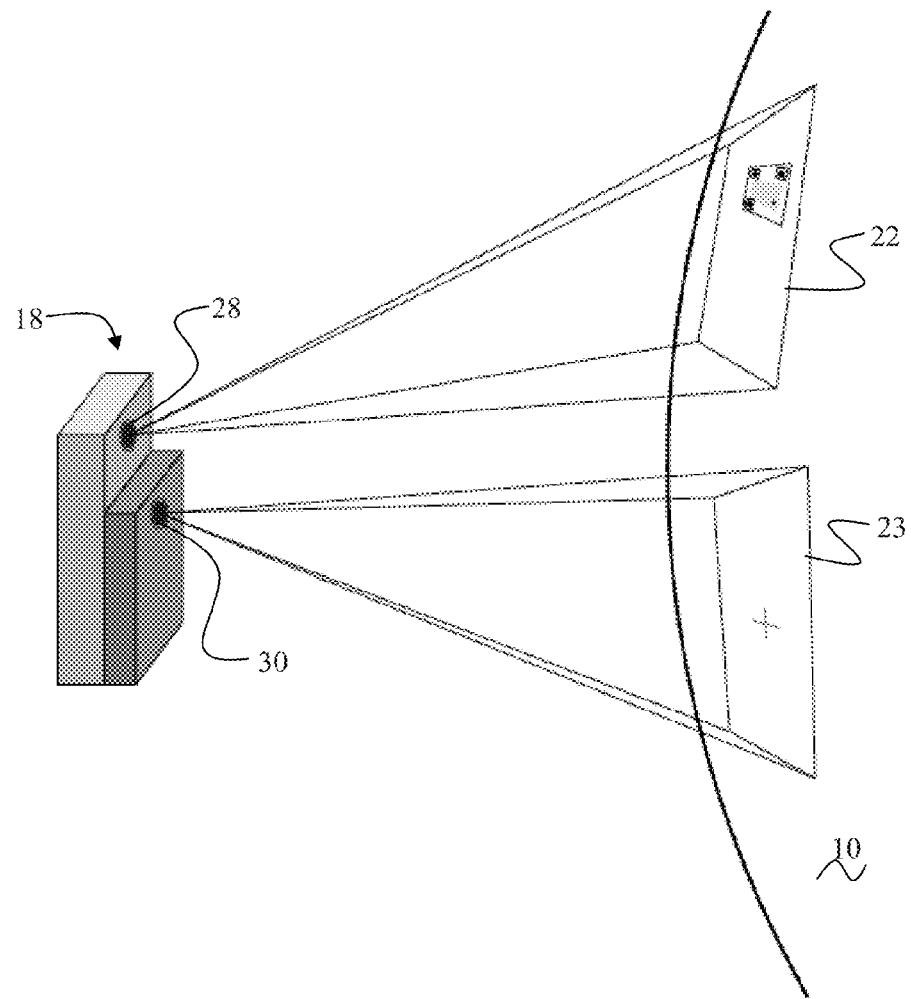
FIG. 7D is a schematic view showing angular offset between the FOV and ROP.

The ROP 23 provided by projector 30 may overlap the FOV 22 of the camera 28 (as shown in FIGS. 2, 4 and 7A-C), or it may be a different region with partial or no overlap (as shown in FIG. 7D). This allows the system to track reference markers in one area of fuselage 10, as described with respect to FIGS. 7A-7C, and project images in another, which is useful in situations where it might be difficult to track features or place markers in areas where projection is needed. When the translation and angle offset between the camera and project aim directions are known, then the relative transformation between them can be used to define the correct location of the projected image. For this situation the transformation matrix describing the projector relative to the structure is needed. This can be determined from the transformation matrix of the camera relative to the structure (which is known from the fiducial-based tracking) and the offset transformation matrix between the camera and the project aim directions (which is a fixed value known from prior measurement), as shown in the equation below:

$$_P^S T = _C^S T _P^C T \qquad \text{EQ 1.}$$

where the subscript/superscripts s, c, p associated with the 4×4 transformation matrices are the structure, camera, and projector references frames, respectively.

Figure 8:
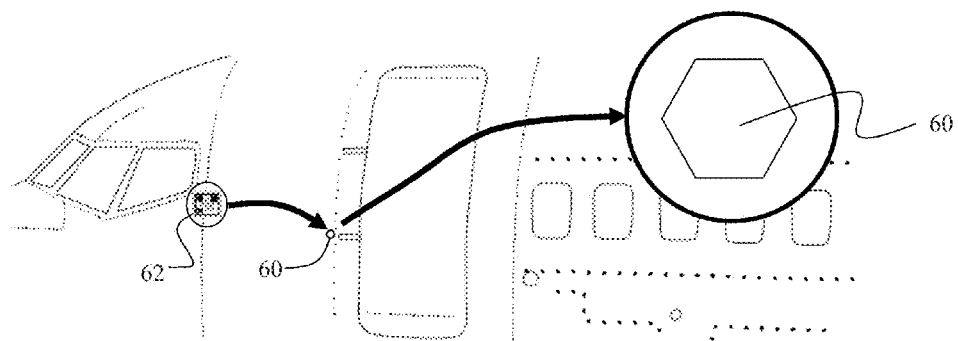
FIG. 8 is a pictorial view showing a "specific feature" for determining placement and data for a QR code pattern marker.

Creation of QR code patterns for use on a structure or object such as the aircraft fuselage 10 may be accomplished using the CAD database in a number of ways. As represented in FIG. 8, a "specific feature" 60 for which the coordinates are known, is shown in context and as a "blow up". This feature can be visually identified on the structure and also found in the CAD database, where the specific three dimensional location of the feature is defined. A QR Code pattern 62 with that data embedded may then be printed and placed directly on or adjacent to the specific feature. In certain applications, the QR code pattern may be permanently placed on the fuselage 10 with indelible ink or paint. If it is undesirable to have visible QR code patterns dispersed on the fuselage, infrared or fluorescing inks may be employed which are visible only to the camera 28 or under certain lighting conditions (for example UV light).

Figure 9:
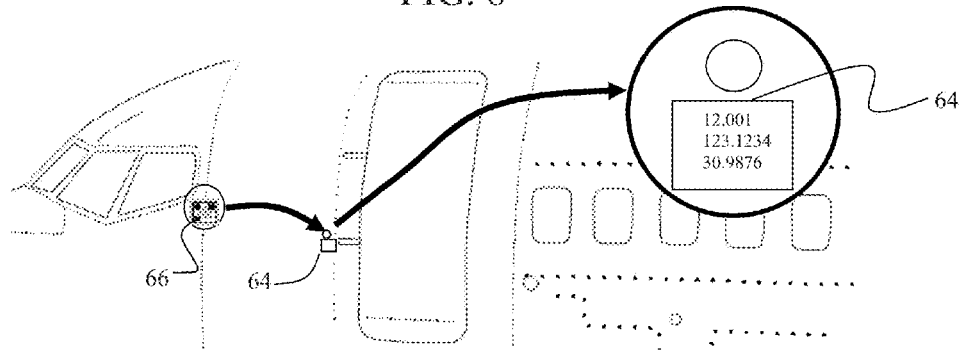
FIG. 9 is a pictorial view showing an annotated predetermined position from the CAD database for determining placement and data for a QR code pattern marker.

Alternatively as shown in FIG. 9, specific identification points 64 (shown in context and as a blow up) may be established to correspond to a specific 3D location within the target object coordinate system and that information may be permanently or temporarily printed on the structure surface with the associated coordinates. A QR code pattern 66 with embedded coordinate data may then be printed and placed directly adjacent to or on the identification point for easy viewing and recognition by the camera 28 in the handheld device 18. Locations of this type may be established to create an arbitrary array of QR code patterns not necessarily associated with particular features on the fuselage to assure that at least one QR code pattern is available within the camera FOV.

Figure 10:
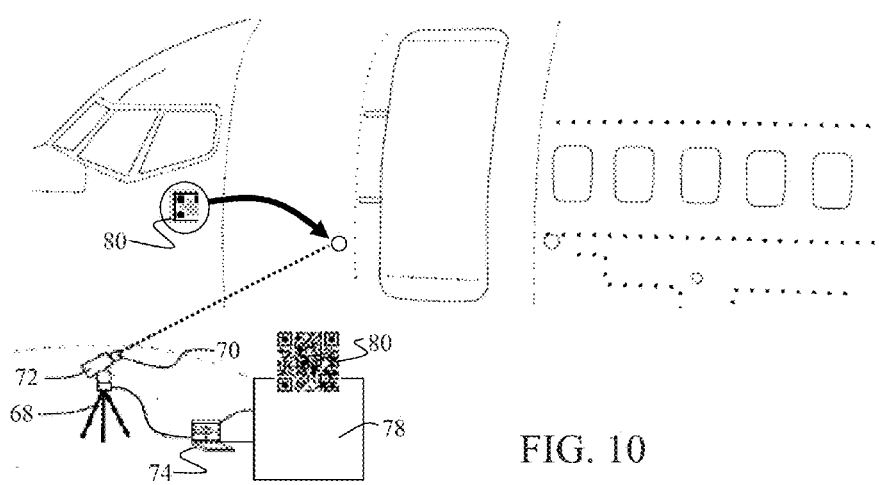
FIG. 10 is a pictorial view showing a use of a local positioning system for determining placement and data for a QR code pattern marker.

Even greater flexibility in establishing a desired identification point may be achieved as shown in FIG. 10 through the use of a local positioning system (LPS) 68 such as the one described in U.S. Pat. No. 8,044,991 entitled LOCAL POSITIONING SYSTEM AND METHOD, the disclosure of which is incorporated herein by reference. The LPS 68 is employed using actual distance measurement with a laser range finder 70 and associated camera 72 to determine a correct 3D location within the target object coordinate system. The LPS control computer 74 may then print to a local printer 78 the QR code pattern 80 for placement on the location designated by the laser dot 82 of the laser range finder 70.

For each of the describe cases, the QR code pattern may be printed in a vinyl appliqué or similar material for removable or semi-permanent placement on the fuselage or other structure. Alternately, a portable ink jet printer (or similar device) could be used to print the QR code directly onto the surface of the structure.

In addition to position (x,y,z) data, orientation data can also be stored in the marker tag data payload, for example Quaternions, Euler angles, or 4×4 homogeneous transformation matrices may be encoded in the tag. In most instances the QR code pattern stickers would be axis-aligned with the fuselage 10 of an airplane, but that might not always the case. If the reference orientation of the data marker is non-zero, orientation can be included in the marker data in the same way as position data, and the method for processing the data by the fiducial-based image tracking algorithms in the software routines operating in the handheld device microprocessor can be setup to work with both forms.

Figure 11:
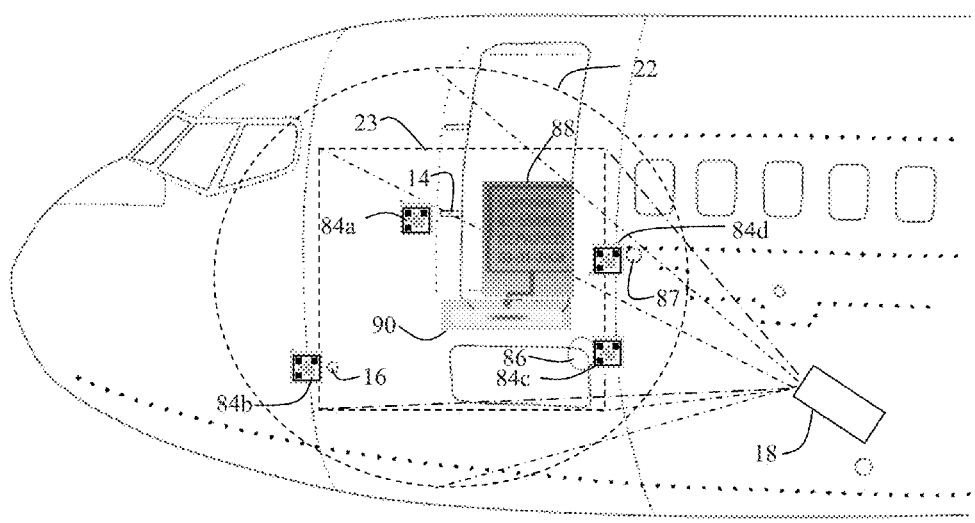
FIG. 11 is a pictorial view of projection of maintenance data onto the ROP based on position determination of the handheld device based on one or more of multiple QR code patterns associated with predetermined features within the FOV.
Figure 12:
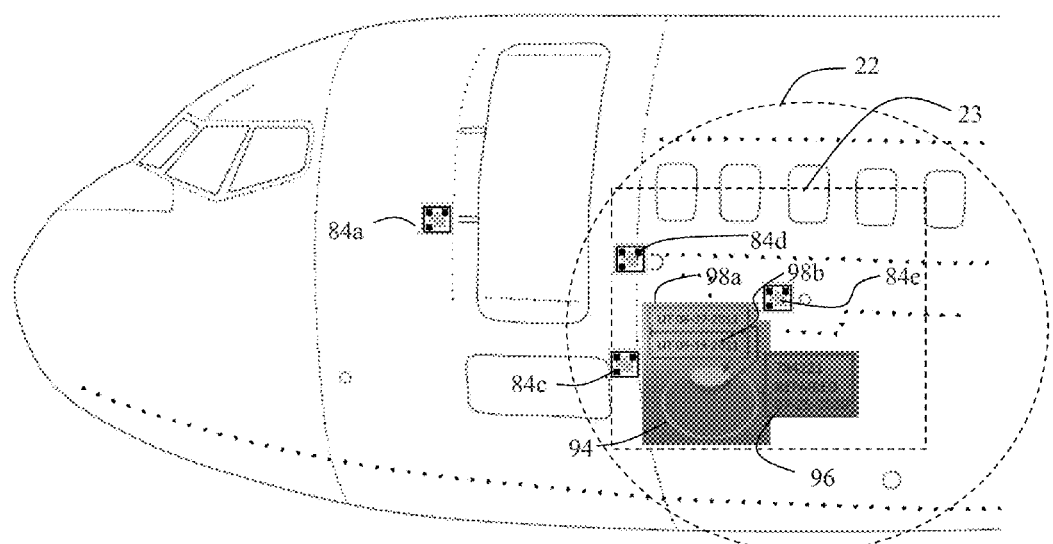
FIG. 12 is a pictorial view of a panned position of the handheld device with projection of new maintenance data onto the ROP based on position determination of the handheld device based on an altered set of multiple QR code patterns associated with predetermined features within the FOV.
Figure 13:
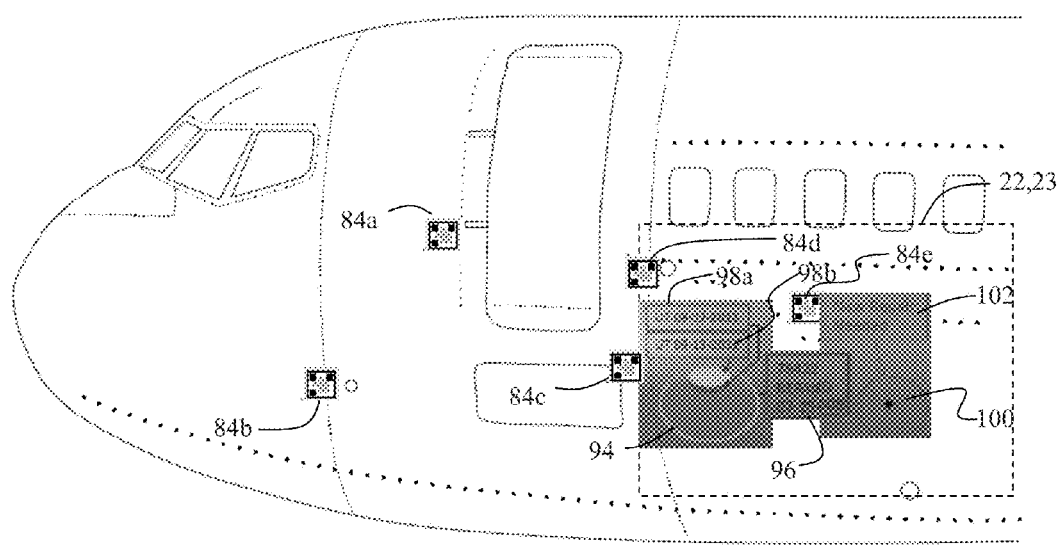
FIG. 13 is a pictorial view of a further panned position of the handheld device with projection of new maintenance data onto the ROP based on position determination of the handheld device based on a new altered set of multiple QR code patterns associated with predetermined features within the FOV.

The real-time interaction between the handheld device 18 and the target object coordinate system through the use of the QR code patterns for establishing the absolute position and orientation, while updating the position and orientation through relative motion from the absolute coordinate reference data allows the handheld device 18 to pan the FOV of the camera 28 and the ROP of the projector 30 across the fuselage as shown in FIGS. 11, 12 and 13. The region on the fuselage within the camera FOV 22a of FIG. 11 includes four QR code patterns 84a, 84b, 84c and 84d associated with (as examples) door hinge 14, pitot static port 16, an access plate upper right corner 86 and a jack support 87, all of which have known locations, which may have been provided by the CAD model or by other prior measurements. The fiducial-based image tracking functionality provided by the software routines in the handheld device may select any of the QR code patterns visible within the camera FOV for determination of the absolute position and orientation of the handheld device 18 for correlation with the target object coordinate system. A CAD database and/or maintenance database provides location specific content for the projector 30 to display in the ROP 23, for example, a data block 88 regarding corrosion repair on the entry door sill and an image 90 of the location and extent of the repair. Visible features are shown in the drawings for reference but hidden features such as underlying structural elements may be located from the CAD database as well and displayed by the projector in the ROP 23.

Panning to the right along fuselage 10 as shown in FIG. 12 moves the camera FOV 22b so that the QR code patterns 84a for the door hinge 14 and 84b for the pitot static port 16 are no longer visible by the camera, but QR code patterns 84c and 84d for access plate upper right corner 86 and jack support 87 are visible with an additional QR code pattern 84e associated with identification a "specific feature" 92 now within the camera FOV. Correlation with the CAD and maintenance databases allows projection of a repair location image display 94 and associated data block 96. Display of location-aligned 3D CAD models is also possible. Additionally, correlation of a NDE history database into the maintenance database allows display of inspection notes 98a and 98b identifying performance of ultrasonic testing of the repair on dates Sep. 27, 2011 and Sep. 12, 2011 respectively (in this example, damage growth is indicated by the difference in the ultrasonic test results at the two test dates.). A further panned location is shown in FIG. 13 wherein the identification points visible in a third location of the camera FOV 22c are now the QR code patterns 84d and 84e related jack support 87 and "specific feature" 92. The projector display region in FIG. 13 shows the projected information present in FIG. 12 but with the slight additional panning of the handheld device. With this ROP, which is shown substantially aligned with FOV 22c, an image 100 highlighting a new location for repair with associated mites data block 102 may be projected.

An alternative embodiment may employ a feature-based tracking process called Visual Simultaneous Localization and Mapping (V-SLAM). See "The vSLAM Algorithm for Robust Localization and Mapping" by Niklas Karlsson, Enrico Di Bernardo, Jim Ostrowski, Luis Goncalves, Paolo Pirjanian, and Mario E. Munich, published in Proceedings of Int. Conf. on Robotics and Automation (ICRA) 2005.

V-SLAM uses high-contrast features visible in the camera FOV, such as the identification points described herein, as intermediate reference points for continuous tracking. In this process the markers containing the absolute coordinate data would be used as landmarks to correct for drift in the V-SLAM absolute relative position calculation. V-SLAM has the advantage of being able to track position and orientation even when a marker tag is not visible within the camera FOV. A combination of fiducial marker-based tracking and V-SLAM tracking may be employed.

Figure 14:
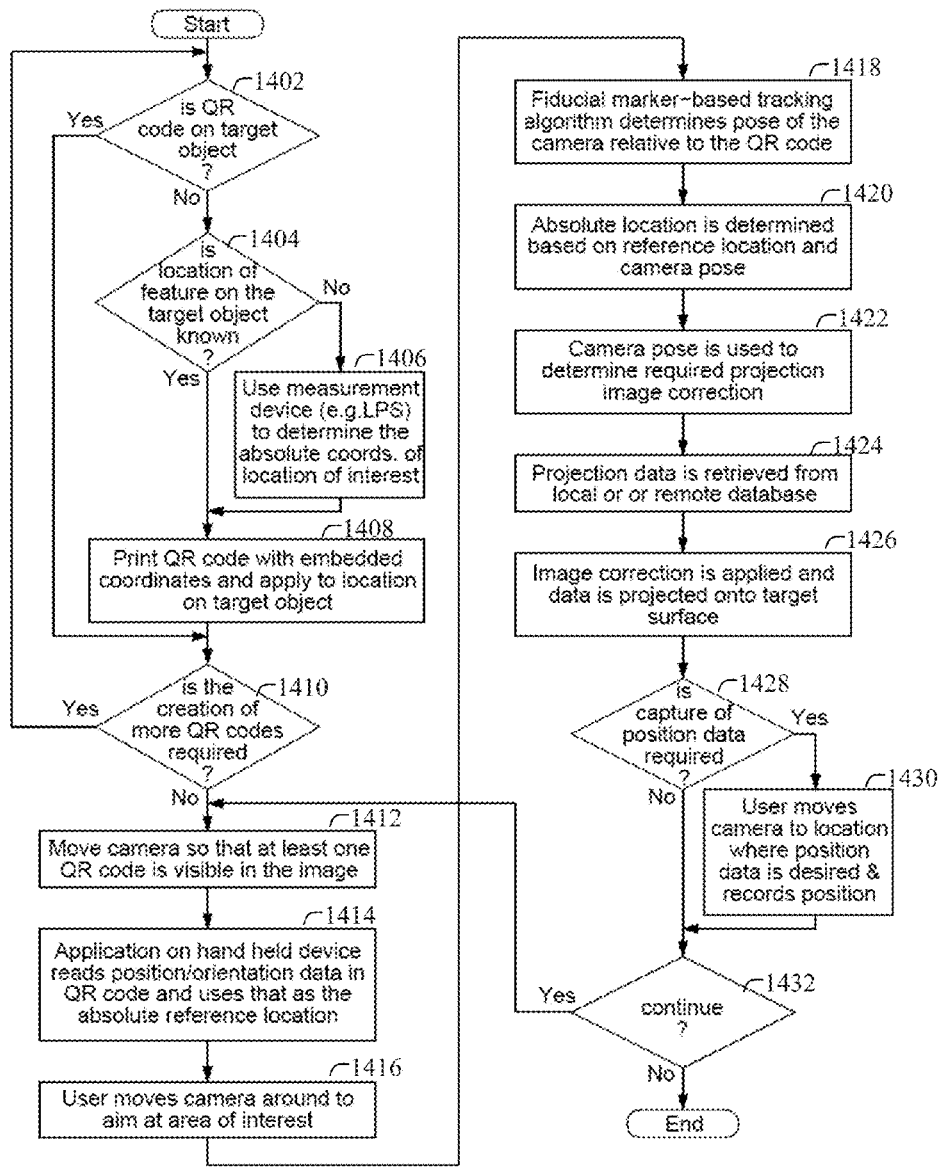
FIG. 14 is a flow chart for implementation of a method for handheld camera/projector operation using optical identification point location on a scanned surface.

The method enabled by the embodiments disclosed is depicted in FIG. 14. A determination is made if QR codes are present on the target object, step 1402. If not, a determination is made if location of a feature on the target object is know, step 1404. The selection of features for the coordinates can be accomplished using "specific features" annotated in the CAD database, predetermining specific point locations on the structure and annotating coordinates from the database directly on the structure. If the location is not known, an LPS or other measurement device may be used to define and locate any arbitrary point on the structure, step 1406. If the location is know or has been established using the LPS, a QR code is then printed with embedded coordinates corresponding to the location defined in the coordinate system of the structure and applied to that location on the target object, step 1408. If more QR codes are required, step 1410, the processes of steps 1402-1408 are repeated. A camera in a handheld device is moved such that at least one QR code pattern on the object within the FOV of the camera, step 1412. An application on the handheld device reads position/orientation data in the QR code to define an absolute reference location, step 1414. The camera is then moved to aim at an area of interest on the object associated with the camera FOV, step 1416. Fiducial marker based tracking determines the pose of the camera relative to the QR code, step 1418. Absolute location is determined based on reference location and camera pose, step 1420. Correcting perspective for projecting onto the object based on the pose of the camera with respect to the QR code pattern, step 1422, is accomplished using the camera pose information relative to the projection surface to compute the amount that the image needs to be warped in order to project properly onto the surface. This correction is needed when the projection direction is not perpendicular to the surface (which will likely be a common occurrence with a hand held device). Projection data is retrieved such as repair history from a maintenance database correlated to the absolute reference location, step 1424. Image correction is applied to the repair history data which is then projected onto an ROP on the object, step 1426, using a projector in the handheld device. The projection is referenced to the coordinate system associated with the object by correlating with the CAD database. The projected repair history may include a display image of a repair location and extent with associated data block for repair description and NDE history for a repair location. Since these images were registered (aligned) within the airplane coordinate system when created, they will be projected in the same location on the physical object (in the examples the fuselage of the airplane) as they were in the database; and because the hand held devices has continuous position and orientation tracking in airplane coordinates, the projected image will stay aligned with that location as the hand held device is moved. The projected image may also annotate locations and information for future required repairs. If capture of position data is required, step 1428, the user moves the camera FOV to encompass that location and the position is recorded, step 1430. The user can create location specific annotations defined in the absolute coordinate system of the target object. These annotations will also stay with that location as the hand held device is moved. Continuing movement of the handheld device, step 1432, will repeat steps 1412-1432.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for providing a location specific maintenance history for an object, said method comprising:
    operating an integrated handheld device having a camera and a projector to locate at least one marker tag within the camera field-of-view (FOV), said at least one marker tag having registration fiducials with embedded three dimensional position data correlating to a CAD database to provide a reference to a coordinate system associated with the object;

determining a location on the object as defined by the at least one marker tag and an associated area; and, projecting onto a region of projection (ROP) on the object, a repair history including a visualization of location and extent of the repair and a data block with descriptive text for the associated area with the projector, the ROP referenced to the coordinate system associated with the object.

2. The method as defined in claim 1 wherein the step of projecting further includes correcting perspective for projecting onto the object based on the pose of the camera with respect to the ROP based on the registration fiducials of the at least one marker tag.

3. The method as defined in claim 1, further comprising indicating a location for placement of the data marker using a local positioning system (LPS) and creating the data marker with registration fiducials to embed three dimensional data correlating to the CAD database regarding coordinates of the location corresponding to that data marker within the registration fiducials.

4. The method as defined in claim 3 wherein the coordinates are determined by identifying a specific feature for which the location is already known.

5. The method as defined in claim 3 wherein the coordinates are determined based on preprinted identification material at the known feature.

6. The method as defined in claim 3 wherein the coordinates are determined by measuring a point on the structure using a measurement instrument such as a local positioning system (LPS) that is calibrated to the coordinate system of the target object, interconnected to the CAD database, and connected to a device capable of printing a QR code pattern containing coordinates of the point.

7. The method as defined in claim 1 wherein the at least one data marker with registration fiducials comprises a QR code pattern.

8. The method as defined in claim 7 wherein fiducial marker-based position and orientation tracking is employed to determine the relative camera pose registered by the fiducial elements in the images.

9. The method as defined in claim 8 wherein a position and orientation offset between the camera and projector is known, and information about the projection surface and offset is used to adjust image data to correct the perspective for projecting onto the ROP on the target object.

10. The method as defined in claim 1 wherein the projected repair history includes a display image of a repair location and extent.

11. The method as defined in claim 1 wherein the projected repair history includes a data block for repair description.

12. The method as defined in claim 1 wherein the projected repair history includes NDE history for a repair location.

13. A system for providing location specific maintenance history, the system comprising:

an integrated handheld device incorporating a camera and a projector;

a microprocessor connected to the communications interface and interconnected to the camera to receive image information of a target object visible within the FOV of the camera and at least one marker tag on the target object, said at least one marker tag having registration fiducials with embedded three dimensional position data correlating to a CAD database, said microcontroller further interconnected to the projector to transmit repair history information incorporated into a projection onto a surface of the target object;

a CAD database and a maintenance database with repair history and having a mating communications interface;

software modules present on the microprocessor, said software modules identifying the at least one marker tag on a structure present in the image information within the FOV of the camera;

reading the location data embedded in the marker tag;

determining a relative position and orientation of the handheld device to the corresponding marker tag;

determining an absolute position and orientation of the hand held device in the coordinate system of the target object;

determining a required perspective correction for the projected image onto the target surface;

retrieving repair history information from the maintenance database corresponding to determined coordinates;

communicating the repair history information to the microcontroller for transmission to the projector; and, controlling the projector for projecting the repair history information including a visualization of location and extent of the repair and a data block with descriptive text onto the surface of the target object.

14. The system as defined in claim 13 wherein the marker tag comprises at least one QR code pattern having embedded data corresponding to coordinates of at least one known feature, said at least one QR code pattern placed on the object proximate the respective at least one known feature.

15. The system as defined in claim 14 wherein the identifying software module reads each QR. code pattern for determination of the coordinates of the associated known feature.

16. The system as defined in claim 15 wherein the software modules further include calculating camera pose from the fiducials present in the camera image.

17. The system as defined in claim 16 wherein the software modules further include calculating a correct perspective for projection of the repair history information by the projector.

18. The system as defined in claim 14 further comprising a local positioning system (LPS) adapted to indicate a location on the target object and a printer adapted to print the data marker with registration fiducials with embedded data regarding coordinates of the location corresponding to that data marker.

* * * * *